May 22, 1962  B. C. MATHEWS  3,035,393
CROP REAPER AND CHOPPER
Original Filed April 22, 1957  4 Sheets-Sheet 1

INVENTOR.
Bernard C. Mathews
BY
Eugene M. Giles  Atty.

May 22, 1962 B. C. MATHEWS 3,035,393
CROP REAPER AND CHOPPER
Original Filed April 22, 1957 4 Sheets-Sheet 3

INVENTOR.
Bernard C. Mathews
BY
Eugene M. Giles Atty.

United States Patent Office

3,035,393
Patented May 22, 1962

3,035,393
CROP REAPER AND CHOPPER
Bernard C. Mathews, Rte. 1, Huntley, Ill.
Continuation of abandoned application Ser. No. 654,288, Apr. 22, 1957. This application Aug. 6, 1959, Ser. No. 832,121
7 Claims. (Cl. 56—505)

This application is a continuation of my prior pending application Serial No. 654,288, filed April 22, 1957 and now abandoned.

This invention relates to a combined crop reaper and chopper which is adapted to harvest or reap crops or plants and at the same time chop or shred the harvested material into pieces which are expelled to a desired place of deposit, as for example into a trailing wagon or back onto the ground.

Devices of this character have been provided heretofore, but difficulty has been experienced in providing facilities which will conjointly perform the reaping and chopping operations satisfactorily and will effectively withstand the severe conditions to which they are subjected.

Moreover, it is important that the chopped material be expelled with certainty from the zone of reaping and chopping and carried continuously and uninterruptedly therefrom to a desired place of collection or deposit and sufficiently convenient and effective facilities for this purpose have not been available.

The principal objects of the invention are to provide simple, convenient and reliable mobile equipment at a low cost which will effectively perform combined reaping and chopping operations which are oftentimes desirable in harvesting and preparing for use various plants and vegetation of the character commonly produced on farms; to remove such plants and vegetation uniformly throughout the area serviced by the device and insure thorough chopping or shredding thereof; to provide facilities which effectively lift the plants and vegetation up into the zone of severance and chopping thereof to avoid places of incomplete cutting; to construct the reaping and harvesting facilities so that they serve to positively expel the material continuously and uninterruptedly from the cutting and shredding zone and avoid clogging; to permit optional discharge of the chopped material into a trailing wagon or back onto the ground; to provide cutting and shredding facilities which are capable of withstanding the severe conditions of use thereof without frequent replacement or repairs; and in general to provide a simple and convenient reaping or chopping device of relatively low cost and of such versatility that it has a wide range of usefulness, these and other objects being accomplished as pointed out more particularly hereinafter and as shown in the accompanying drawings, in which:

Figure 6:
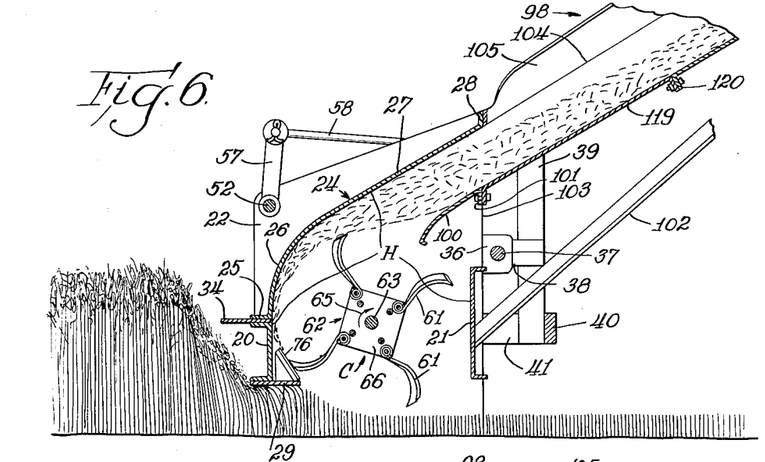
FIG. 6 is a sectional view taken substantially on the line 6—6 of FIG. 3 and showing the device in the operation of reaping and chopping and discharging into the chute which leads upwardly to deposit into a trailing wagon.
Figure 7:
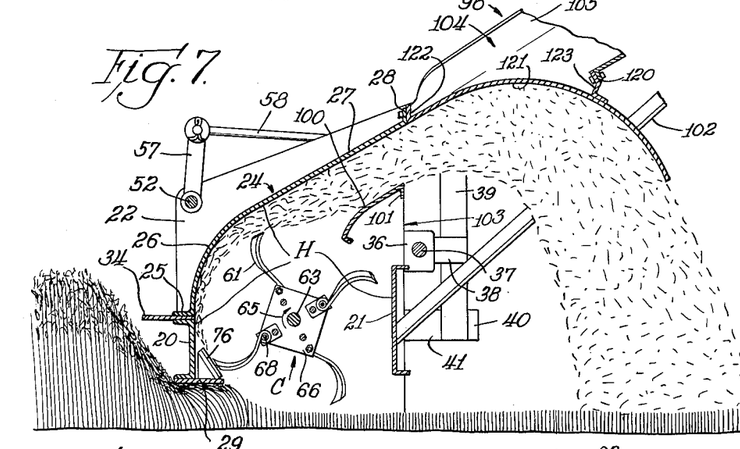
FIG. 7 is a view, similar to FIG. 6, but showing the device adapted to discharge back onto the ground.

The device as shown in the drawings for the purpose of illustration is adapted to be drawn by a tractor or other vehicular source of power, and comprises a main frame or assembly in the form of a housing which is indicated as a whole by the letter H in FIGS. 6 and 7 and is open at the bottom to receive ground borne material therein as it moves over the ground. This main frame and assembly comprise a heavy transverse channel iron 20 providing a transverse girder at the front and a wide transverse channel iron 21 providing a transverse girder at the rear, both of which extend between and are rigidly secured at their ends to heavy end plates 22 of corresponding shape which constitute the housing end walls and each of which extends downwardly to a low level approximately at the stubble height of the harvested material and has an angle iron 23 secured thereto at the bottom and located at the outer side and extending from front to rear.

The housing also includes a piece of sheet material or plate 24 in the form of a hood which extends between the plates 22 to close the housing at the front and top and has an outturned flange 25 across the front which is secured to the top flange of the front channel iron or girder 20, and this plate 24 is curved upwardly and rearwardly, as shown at 26 in FIGS. 6 and 7, about an axis which extends between corresponding points of the two end plates 22 and this hood plate 24 has an extension continued tangentially rearwardly and upwardly, as indicated at 27, to the rear edges of the end plates 22 where it has the edge portion thereof turned up to form the flange 28.

A heavy plate 29 is rigidly secured to the underside of the bottom flange of the front channel iron 20 and extends a uniform distance at the rear thereof for a purpose hereinafter explained and this plate 29 also extends forwardly from the channel iron 20 to serve as a draw beam to which a draw bar or tongue 30 (see FIG. 1) is rigidly secured at a place midway between the ends thereof and projects forwardly therefrom for draft connection to a tractor or other vehicle by which the device is to be drawn across a field or other area in performance of its function.

This draw bar or tongue 30 is provided with any suitable facilities at the front end for vertical pivotal securement thereof to the tractor, such for example as corresponding upper and lower end plates 31 with corresponding openings 32 to receive a vertical coupling pin.

Figure 1:
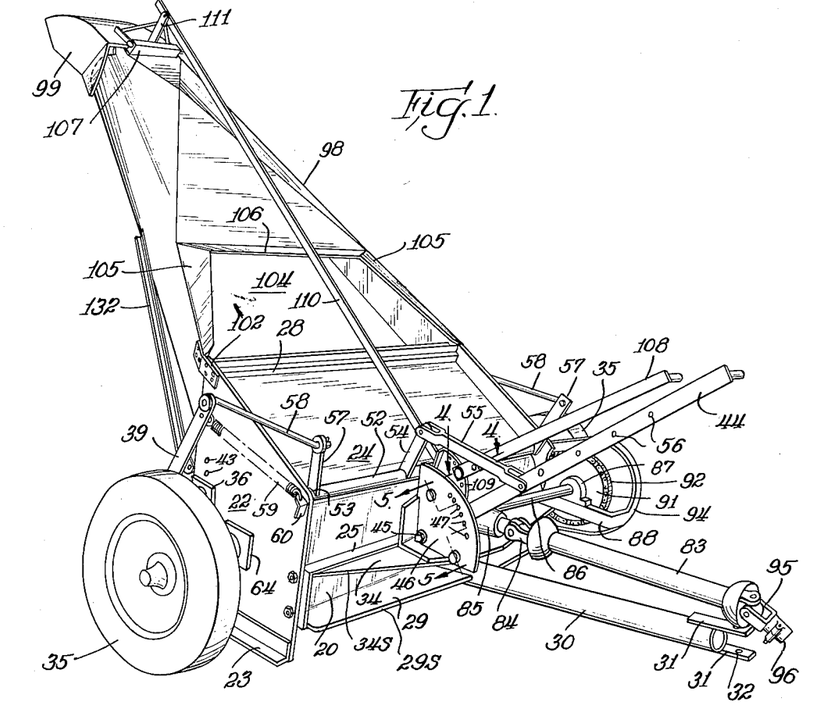
FIG. 1 is a front and side perspective view of a combined reaper and chopper constructed in accordance with the invention.

Preferably also the draw beam plate 29 has the front edge thereof correspondingly sloped rearwardly at opposite sides of the place of securement of the draw bar or tongue 30 thereto, one such slope being indicated at 29S in FIG. 1.

Another heavy plate 34 is also secured to the top flange of the front channel iron 20 and projects only at the front thereof and this plate 34 is interposed between the top flange of the channel iron 20 and the outturned flange 25 of the hood 24. This plate 34 serves as a mounting for parts which are located at a place intermediate of the ends thereof and the front edge of this mounting plate 34 is sloped rearwardly at opposite sides of this intermediate mounting place as indicated at 34S in FIG. 3.

Ground wheels 35 are located at the opposite ends of the assembly above described, at the outer sides respectively of the end plates 22 and these ground wheels 35 are arranged for corresponding vertical movement relatively to the end plates 22 so that when the wheels 35 are resting on or moving over the ground, the main frame assembly or housing may be adjusted to different selected elevations from the ground.

Figures 2, 4:
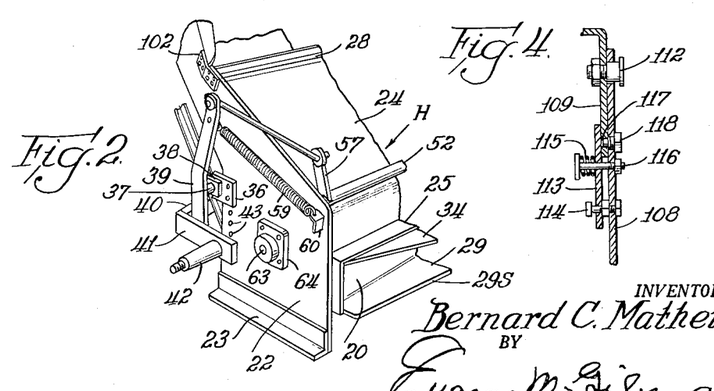
FIG. 2 is a fragmentary view of the near end portion of the device of FIG. 1 with the ground wheel removed and parts in a different position than shown in FIG. 1.
FIG. 4 is an enlarged sectional view on the line 4—4 of FIG. 1.

For this purpose, corresponding brackets 36 are secured to each end plate 22 at the rear and each is provided with a bearing beyond the rear edge of the respective end plate 22 to receive a transverse rock shaft 37 which has secured thereto at each end, beyond the respective bearing, a heavy short crank arm 38 and each crank arm has an upright lever 39 secured thereto with a long end projecting upwardly above the crank arm 38 and a shorter end portion projecting therebelow as shown in FIGS. 1 and 2.

A heavy bar 40 extends between and is rigidly secured to the shorter depending lower end portions of the levers 39 (see FIGS. 5, 6 and 7) and the opposite end portions of this bar 40 are bent forwardly at the outer sides of the depending lower end portions of the levers 39 as shown at 41 and these forwardly extending portions 41 are alike and each has a spindle 42 projecting outwardly therefrom near the forward end and in axial alignment with the other spindle 42 and each spindle 42 has the respective one of the ground wheels 35 mounted thereon.

Thus by rocking the upper ends of the levers 39 back and forth while the wheels 35 are on the ground, the entire main frame or assembly may be adjusted vertically to different elevations above the ground, and it is to be noted that when the tongue 30 is connected to a tractor this connection maintains the main frame or housing in approximately the same level position in all positions of such vertical adjustment, or in other words the main frame or assembly is held against forward and rearward tipping when connected to the tractor and in operation, by the tongue connection with the tractor.

The brackets 36 are preferably bolted to the end plates 22, the latter being provided with bolt holes for this purpose and the plates 22 are provided with a vertical series of such bolt holes, some of which are indicated at 43 in FIGS. 1 and 2 to permit selective adjustment of the brackets 36 at different elevations thereon for increasing the range of adjustability of the main frame or assembly from the ground, and in each position of adjustment that is effected by changing the location of the brackets 36 the main frame or assembly has a range of adjustment by rocking the upper ends of the levers 39 back and forth.

For accomplishing this lever adjustment and holding the levers 39 in selected positions of such adjustability, a hand lever 44 is provided at the front of the frame within convenient reach of the operator on the tractor and is pivoted at its lower end as indicated at 45 to a segment plate 46 which is secured to the above mentioned mounting plate 34 and the lever 44 moves along one side of this segment plate and has latching engagement therewith for holding the lever 44 in its various positions of adjustment.

The latching facilities may be of any type adapted to hold the lever 44 with certainty in each position of adjustment thereof and as shown herein the segment plate 46 is provided with an arcuate series of openings 47 with which a pin 48 on the lever 44 is selectively engageable.

Figures 3, 5:
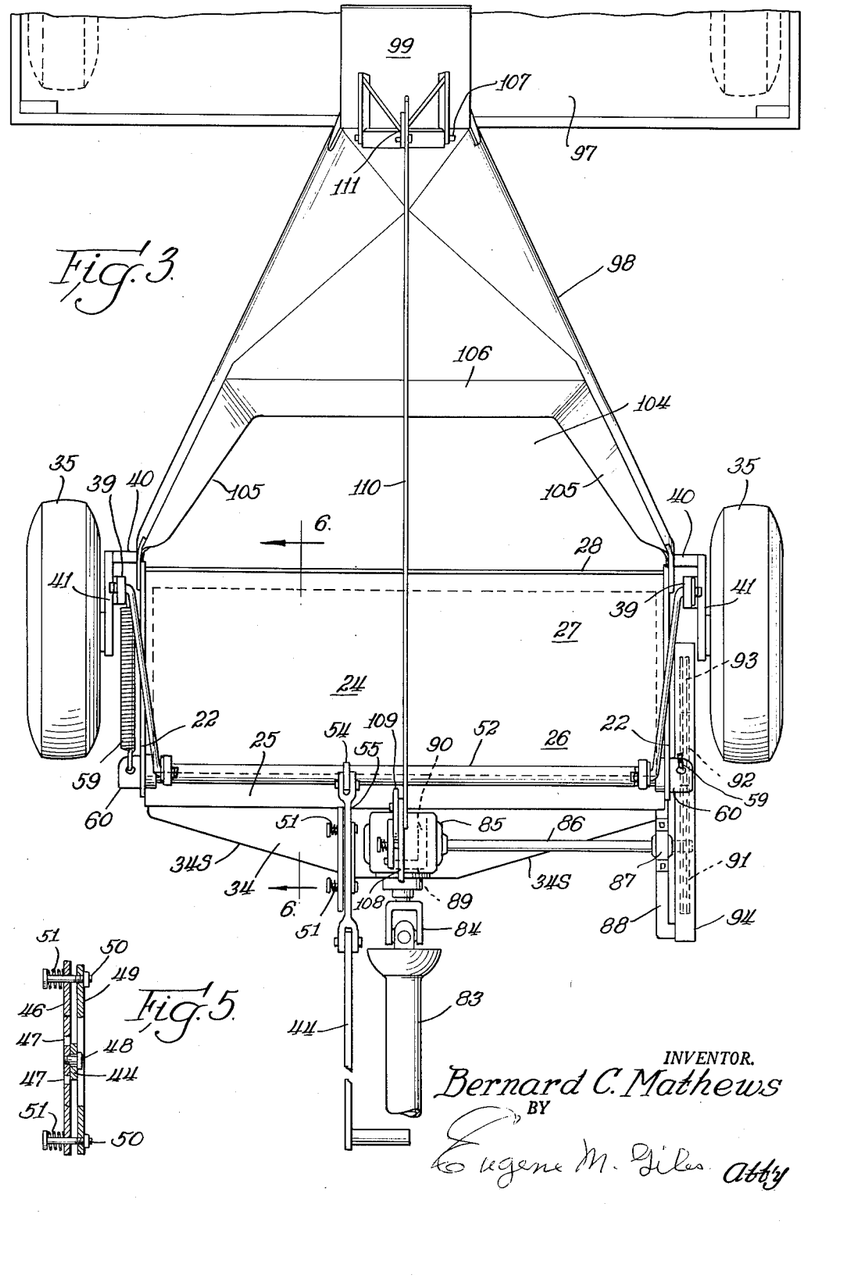
FIG. 3 is an enlarged top view of the device of FIG. 1 showing a fragmentary portion of a trailing wagon into which the device is arranged to discharge.
FIG. 5 is an enlarged sectional view on the line 5—5 of FIG. 1.

A strap 49 is spring held against the outer face of the lever 44 for holding the pin 48 in engagement with the selected opening 47, the said strap 49 being provided with pins 50 at the opposite ends which project through the segment plate 46, as shown in FIG. 5, and terminate in headed ends between which and the segment plate 46, coil springs 51 are interposed.

The pivotal connection 45 of the lever 44 with the segment plate 46 is sufficiently loose to permit the lever 44 to be moved laterally at the location of the latching pin 48 against the tension of the springs 51 to release the pin 48 from the opening 47 with which it is engaged, for shifting the lever to another position and thus the lever 44 may be adjusted to any of the positions determined by the openings 47.

A rocker shaft 52 extends between the plates 22 and is engaged at its ends in bearings 53 on said plates and the shaft 52 has a crank 54 thereon approximately midway between the ends of the shaft 52 and connected at its outer end by a link 55 to the hand lever 44, the latter of which may have a series of openings 56 permitting adjustability of the connection of the link 55 therewith.

The said rocker shaft 52 has other cranks 57 at the opposite ends thereof which are connected respectively by links 58 with the upper ends of the arms 39, so that adjustment of the hand lever 44 rocks the arms 39 and adjusts the elevation of the main frame or assembly relatively to the ground wheels 35.

To compensate for the weight of the main frame or assembly and facilitate the adjustment thereof, each arm 39 is connected near its upper end by a coil spring 59 to a bracket 60 on the respective end plate 22, the springs 59 being of such tension that only a moderate effort is required to effect the elevational adjustment of the main frame or assembly by the lever 44.

Figure 11:
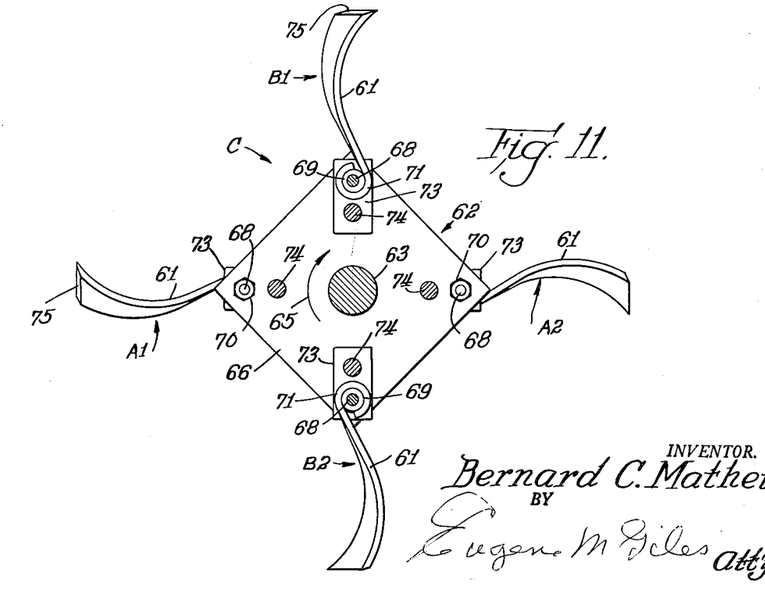
FIG. 11 is a sectional view taken on the line 11—11 of FIG. 10.

The housing H is adapted to accommodate and support therein a rotatable harvesting element which is provided with cutting and chopping facilities and indicated as a whole by the letter C, and the cutting and chopping facilities thereof comprise a plurality of cutter arms 61 arranged along the length of and pivoted to a rotor 62 which extends from end to end of the housing and has a center shaft 63 journaled in bearings 64 on the end plates 22 of the housing, and these cutting and chopping facilities are rotated in the direction indicated by the arrows 65 in FIGS. 6, 7 and 11, or clockwise as viewed in said figures, to perform the cutting and chopping operations thereof, and as they rotate forwardly at the bottom of the housing these cutting and chopping facilities project through the open bottom of the housing close to the ground to cut off ground borne material above the surface of the ground and scoop it up into the housing.

The cutter arms 61 are pivoted eccentrically to the rotor 62 at a uniform distance from the shaft 63 so they are caused to project directly outward therefrom by centrifugal force when the rotor is rapidly rotated, and they are equally distributed at opposite sides of the shaft 63 for balance and arranged sufficiently close to one another axially to insure continuity and uniformity of cutting from end to end of the interior of the housing.

Figure 10:
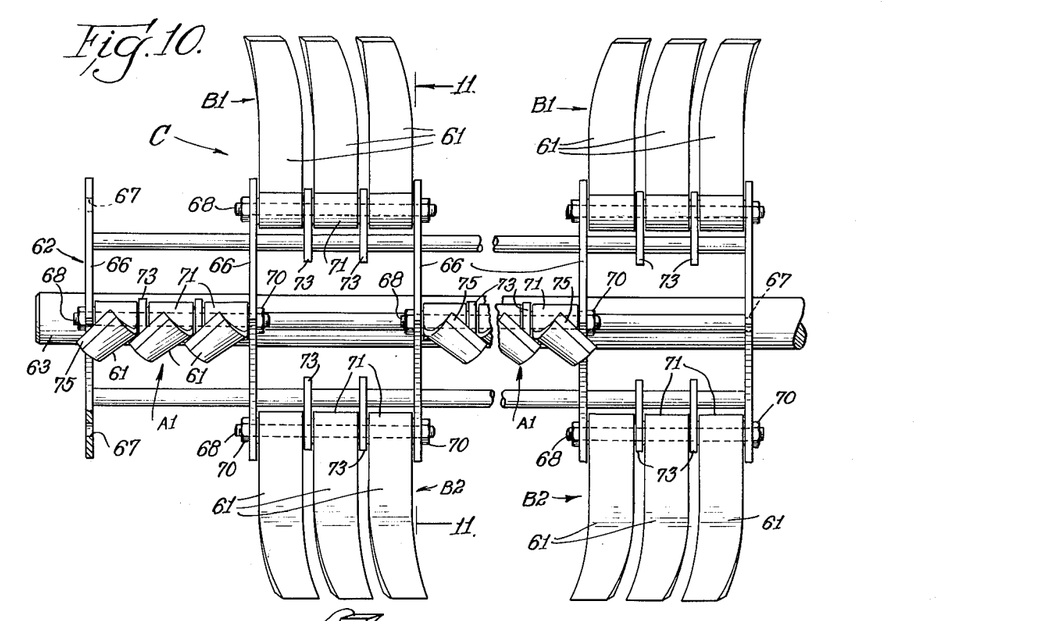
FIG. 10 is an enlarged top view with an intermediate part broken away, of the rotatable cutting and chopping facilities.

Preferably these cutter arms 61 are arranged in sets or groupings, as for example with three side by side arms in each set or grouping as shown in FIG. 10, and each such set is paired with a corresponding diametrically opposite set and the sets of each such pair are a quarter turn distance around the shaft 63 from the pair next adjoining thereto axially of the shaft. Thus the spaced apart sets of each series alternate or are staggered with respect to the series next adjoining circumferentially.

For convenience in distinguishing the alternate pairs of cutter arm sets or three arm groups the sets of one of the alternate series are identified in the drawing by the letter A and the sets of the series which alternate therewith or are staggered with respect thereto are identified by the letter B, and each with the added numeral 1 or 2 to identify the individual sets of each pair.

Thus the sets or three arm groups A1 are in line at one side of the shaft 63 and paired with the companion sets A2 which are likewise in line at the opposite side of the shaft, and these thus aligned sets A1 and A2 are a quarter turn distance from and alternate or are staggered with respect to the sets B1 and B2 which are likewise at respective opposite sides of the shaft 63.

For mounting these cutter arms 61 the rotor 62 is constructed with a plurality of mounting plates 66 fixedly secured to the shaft 63 at equally spaced intervals therealong so as to turn with the shaft, these plates being spaced apart to accommodate therebetween the number of cutter arms which are to constitute a set, for example three, as shown herein.

Because the cutter arms are connected to these plates 66 at quarter turn intervals around the shaft 63, the plates are preferably square, as shown herein, with the arms 61 connected thereto at the corner portions and for this purpose all of the plates 66 are correspondingly oriented on the shaft 63 so that the respective corners thereof are aligned in the direction of the length of the axis of the shaft 63, and the corner portions of these plates 66 are provided with openings 67, likewise aligned, to receive spindles 68 on which the arms 61 are pivoted.

Two spindles 68 extend between each two adjoining plates 66 and are respectively at the plate corners at diametrical opposite sides of the shaft, with the spindles 68 of each consecutive pair thereof at a quarter turn distance from the spindles 67 of the preceding and succeeding pair. Intermediate plates 66 have two such quarter turn pairs of spindles 68 attached thereto and projecting at opposite sides therefrom respectively whereas the end plates 66 have only one pair of spindles 68 attached thereto.

The cutter arms 61 are pivoted at their inner ends on the spindles 68 to swing freely thereon and may be pivoted directly on the spindle, but I prefer to pivot the cutter arms on bushings 69 which are telescoped on the spindles, and the arms 61 are formed at their inner ends with sufficiently large loop or hub portions 71 by bending the inner end portion of the arm to a loop form as shown in FIG. 11, so that the loop or hub portion 71 loosely encircles the bushing 69.

The spindles 68 are removable for convenient removal of the arms for sharpening or replacement and may be secured in the openings 67 of the mounting plates 66 in any convenient manner which will retain them safely in place. They may be threaded at their opposite ends and provided with positive lock nuts 70 at each end as shown herein, or a headed bolt may be employed for such spindle 68 with a lock nut at one end only or the spindles 68 may be secured to the plates 66 in any other desired manner.

Preferably the arms 61 of each set are spaced apart, as shown particularly in FIG. 10, and for this purpose, anchor plates 73 are employed which are anchored at their inner ends to stringer rods 74 which extend through the plates 66 from end to end of the rotor, and these anchor plates project outwardly between the loop or hub portions 71 of adjoining arms 61 of each set thereof and are provided with openings through which the spindles 68 extend.

Four such stringers 74 are provided to provide anchorage for anchor plates 73 for the sets of cutter arms at quarter turn intervals around the shaft 63 and all of the sets A1 are anchored to one stringer and all of the A2 sets are anchored to another stringer, and the sets B1 and B2 are anchored respectively to two other stringers.

Obviously the bushing 69 may be of a length to extend betwen the plates 66 to which the respective spindle 68 is secured and the anchor plates 73 may have openings therethrough to accommodate the long bushing 69, but I prefer to employ short bushings which are slightly longer than the individual hubs 71 and interposed and clamped between the anchor plates 73 and spindle supporting plates 66, so that the bushings 69 serve as individual spacers between the two plates 73 and between said plates 73 and the plates 66.

Each of the anchor plates 73 is of the same thickness as that of the mounting plates 66 so that the spacing of the arms 61 of each set from one another is the same as the spacing of each pair of sets, for example the sets B1 and B2, from the pairs of sets next adjoining axially, for example, the sets A1 and A2 and thus the cutter arms 61 are equally spaced axially throughout the length of the rotor 62.

The particular shape of the arms 61 as well as the arrangement thereof for cutting is important and each is composed of a strip of thin section carbon steel hardened to the right degree so they are tough and flexible, and the loop or hub 71 may be provided by bending one end of this strip stock into the required form.

The strip stock is quite wide, for example preferably nearly two inches, with three widths and the two intervening anchor plates 73 occupying a six inch space between mounting plates 66, and they are twisted and have their outer ends curved forwardly in the direction of rotation as shown in FIGS. 10 and 11 and at their outer ends they are beveled, as indicated at 75, to provide a sharpened cutting edge.

By reason of the twisted and curved outer ends thereof, the arms not only have the outer ends of the strip stock thereof turned forwardly sufficiently to provide a good cutting edge, but the cutting edge is thereby arranged diagonally at such angle to the direction of cutting movement thereof to have a lengthwise draw or slicing effect in the cutting which greatly increases the cutting efficiency thereof. It also is protective of the cutting edge and the arm as the cutting edge strikes objects at a slant so that the shock is not as severe as it would be upon direct impact. The amount of angularity of the cutter edge 75 to the direction of cutting movement thereof is preferably between 18 and 30 degrees although greater or less angularity may be employed, for example, within the range of 10 to 40 degrees.

Moreover by reason of the twist and curve of the outer ends of the arms 61, the cutting edges thereof are offset laterally in the direction of the length of the rotor, as shown particularly in FIG. 10, and are thereby adaptable to insure continuity of cutting throughout the entire length of the rotor 62.

For this purpose the cutter arms of each set are twisted and bent in the same direction so that they are all offset toward the same end of the rotor and some sets have right hand offset and others have left hand offset and they are arranged so that one set of each pair is offset in one direction and the companion set which is paired therewith at the opposite side of the shaft 63 is offset in the opposite direction.

Thus in the illustration of FIG. 10 the B1 set of arms 61 nearest to the left hand end of the rotor have their outer ends offset toward the left hand end of the rotor, whereas the companion B2 set which is paired therewith at the opposite side of the shaft 63 have their outer ends offset toward the right hand end of the rotor.

Moreover it is preferred to have each consecutive set of each series thereof offset oppositely to the immediately preceding set thereof and accordingly, as shown in FIG. 10, the arms 61 of the first A1 set at the left are all offset toward the left and the arms 61 of the next A1 set are offset to the right and thus the arms of the next B1 set will be offset to the left and so on throughout the length of the rotor.

Thus as the series of B1 sets of arms are performing their cutting operation, part of the sets have their cutting edges sloping toward one end of the rotor and other have their cutting edges sloping toward the other end of the rotor with the result that the deflecting tendency toward one end of the rotor is equalized or substantially equalized by a corresponding deflecting tendency toward the other end of the rotor.

With this arrangement of the cutter arms so that the cutting edges of companion pairs are offset in opposite directions, active cutting edges are assured at the intervals between the arms which are occasioned by the anchor plates 73 and also at the intervals between the sets which are occasioned by the mounting plates 66 and there is unbroken continuity of cutting from end to end of the rotor.

Thus by the simple expedient of twisting and bending the outer ends of the strip stock of the cutter arms 61 the advantages are accomplished of providing a good cutting edge, providing an inclined approach of the cutting edge which not only greatly increases the cutting efficiency but also safeguards the cutting edge against impact damage, and also provides continuous cutting from end to end of the rotor, and all this is accomplished without special or difficult forming processes or specially prepared stock patterns as standard strip stock is employed which is merely cut to length and shaped with simple, inexpensive and readily available equipment.

Moreover these cutter arms have the advantage that they tend to toss the cut material sidewise as it is cut for thorough and uniform chopping and shredding thereof, and furthermore these cutter arms have additional advantages in lifting the plants or vegetation up into the zone of severance and chopping to avoid places of incomplete cutting, and also in expulsion of the chopped material effectively and with certainty from the cutting and chopping zone and in conveying it to the place of disposal; as will be more fully explained hereinafter.

These cutters 61 cooperate with a shear plate in the performance of their cutting operation and this shear plate, which is indicated at 76 is mounted on the rearwardly extending shelf portion of the draw plate 29 and sloped upwardly and forwardly as shown in FIGS. 6 and 7 so that the exposed face 77 thereof is tangential or substantially tangential to the circular path of the cutting edges 75 of the cutter arms as the latter are rapidly rotated.

This shear plate 76 extends from end to end of the interior of the housing H and is provided at the back thereof with webs 78 which fit in the corner between the rearwardly extending shelf portion of the draw plate 29 and the upright web of the front channel iron 20 and the webs 78 have mounted flanges or ears 79 at the bottom with openings 80 therethrough to receive bolts by which the shear plate is secured to the shelf portion of the draw plate 29 and these openings 80 are slightly elongated from front to rear for adjustment of the shear plate. This shear plate may be a single continuous length or made up of sections if desired.

As this device is drawn forwardly along the ground and the rotor 62 is rapidly rotated in the direction indicated by the arrows 65, upstanding plants and vegetation are whipped against the lower edge of the shear plate 76 or the rear edge of the shelf portion of the draw plate 29 and may be thereby cut off by the cutting edges 75 of the cutter arms 61, but for certainty of complete and clear severance the front face of the shear plate 76 is recessed to provide prominent sharp cornered ribs arranged in upper and lower rows, the lower ones of which are indicated at 81 and are parallel and inclined at approximately a 45 degree angle to the length of the shear plate and the upper ones of which are indicated at 82 and are likewise parallel and inclined at approximately a 45 degree angle to the length of the shear plate but at an opposite inclination to that of the lower ribs 81 so that the upper ribs 82 are approximately at right angles to the ribs 81.

Figure 8:
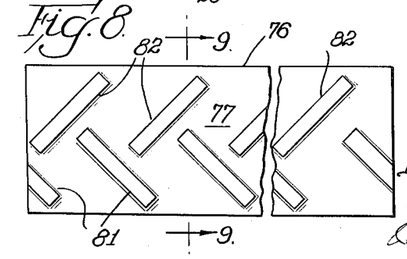
FIG. 8 is a face view of the shear plate with which the rotary cutters and choppers of the device cooperate.
Figure 9:
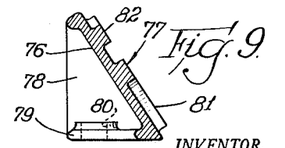
FIG. 9 is a sectional view taken on the line 9—9 of FIG. 8.

The two rows of ribs 81 and 82 are partially intercalated at their adjoining upper and lower margins respectively, as shown in FIG. 8, so as to form a continuous zig-zag pattern throughout the length of the shear plate 76, with each lower rib 81 extending substantially perpendicularly toward the middle of and spaced a short distance from an upper rib 82 and each upper rib 82 in like manner extending substantially perpendicularly toward the middle of and spaced a short distance from a lower rib 81, and these ribs, which are preferably faced off uniformly and thereby provided with sharp edges are arranged so that the cutting edges 75 of the cutter arms 61 barely clear the rib faces at the place where the ribs are intercalated so as to provide a shearing cooperation of the cutters with the ribs of the shear plate 76 for positive cutting of plants and vegetation whipped up by the cutter arms into the cutting zone.

The cutting and chopping facilities C may be operated from any convenient source of power, but the illustrated reaper and chopper is shown herein for operation by a tractor or the like by which it is drawn, being a common practice to use tractors for such purposes and to equip the tractor with power take off facilities at the rear for such purposes.

Accordingly a power connection is shown herein comprising a power supply shaft 83 which is connected at the rear end through a universal joint 84 to gearing in a gear box 85 by which power is transmitted to a cross shaft 86 which extends to one side of the machine and is journaled at its outer end in a bearing 87 supported by frame member 88 provided at one end of the housing H for that purpose.

The gearing in the gear box 85 may be of conventional form, as for example, a bevel gear 89 secured to a stub shaft from the universal 84 and meshing with a bevel gear 90 secured on the inner end of the cross shaft 86.

At its outer end the cross shaft extends beyond the bearing 87 and has a large sprocket 91 fixed thereon and connected by a link belt 92 with a small sprocket 93 on the end of the rotor shaft 63 which projects through the end plate 22 at the end of the housing. A guard 94 is preferably provided within which the sprockets 91 and 93 and link belt 92 are located and the guard is mounted at its forward end on an extended portion of the projecting frame member 88 and at its rear end on the adjoining end plate 22 of the housing.

The power supply shaft 83 extends forwardly to a place near the forward end of the draft bar 30 where the latter couples to the tractor and at its forward end the shaft 83 has a universal point 95 with a coupling 96 thereon for connection to the rear end of a power operable shaft of the tractor from which power is transmitted through the shafts 83 and 86 and the sprockets 91 and 93 and the link belt 92 to the rotor shaft 63.

The power transmission facilities thus described are arranged to rotate the rotor 62 and cutter arms 61 at high speed in the direction indicated by the arrows 65 so that the arms 61 are extended directly outward from the rotor by centrifugal force and as the described machine or implement is drawn forwardly, plants and vegetation or other material on the ground over which the implement is drawn, pass under the front channel iron 20 and draw plate 29 on the bottom thereof into the housing H where if growing or upstanding they are cut off at the particular level for which the implement is set by the selected location of the bearing brackets 36 on the housing end plates 22 and the adjustment of the hand lever 44.

Because of the rapidity at which the cutter arms 61 are rotated the material entering the housing H not only is cut off but is repeatedly operated upon by the cutter arms which chop and shred the material into pieces and eventually discharge it from the housing as hereafter explained.

Generally it is desired to collect the material thus chopped and shredded into a wagon for transportation to a place of storage, as for example to a silo, and it is an important feature of the present invention that facilities are provided which will effectively convey the chopped and shredded material with certainty to a high elevation for deposit into a trailing wagon and without any power operated facilities therefor other than the cutting and chopping facilities themselves.

The trailing wagon is usually connected to and drawn by the same tractor to which the cutting and chopping implement is connected and trails at a short distance behind the cutting and chopping implement substantially as shown in FIG. 3 in which the reference numeral 97 indicates the forward end of such trailing wagon, and the reference numeral 98 indicates as a whole a chute through which the chopped and shredded material is conveyed from and by the chopping and shredding facilities to the wagon.

This chute is somewhat funnel shaped with a wide flattened lower entrance end which is secured to the rear upper part of the housing H and tapers upwardly and rearwardly to an outlet at the upper end which is at a sufficiently high elevation to extend over the front wall of the wagon box of the trailing wagon 97 and is provided with an adjustable hood 99 at the outlet for directing the discharge therefrom at varying distances therefrom into the wagon.

The curvature of the wall portion 26 of the housing is not concentric with the axis of rotation of the rotor shaft 63 but is of volute form gradually increasing in distance from the orbit of the cutter arms 61, as shown in FIGS. 6 and 7, as it leads to the tangential portion 27 so that an appropriate tangential exit is provided at that place permitting the chopped and shredded material to leave the cutter arms and be thrown tangentially upwardly and rearwardly and the chute 98 is attached to the upper rear of the housing H at the top thereof in line with the tangential discharge to receive the material thus discharged from the housing and convey it therefrom up to the wagon 97.

The underside of the discharge or exit passage from the housing H is defined by a plate 100 which extends from end to end of the housing H and is secured to the end plates 22, and this plate 100 has its upper end portion substantially parallel with the tangential portion 27 of the housing wall, and curves downwardly to its forward extremity, which is located just outside the orbit of the cutter arms as shown in FIGS. 6 and 7 to provide a flared mouth to receive the material therein from the chopper and shredder. The upper end of the plate 100 is spaced above the rear girder 21 and its forward extremity is spaced forwardly from the top of the girder 21 to provide an opening between the girder 21 and plate 100 as shown in FIGS. 6 and 7.

The chute is secured at its forward end to a downturned flange 101 along the rear edge of the plate as shown in FIG. 6 and is also secured to the end walls 22 of the housing by straps 102 (see FIGS. 1 and 2) and it is braced for remote support near its outer end by angle irons 132 which are inclined downwardly to and secured to the rear channel iron or girder 21 of the housing.

Rapid rotation of the cutter arms 61 imparts a high impetus to throw the chopped material outwardly from the interior of the housing into and through the chute 98 in which it is convergently directed to the discharge opening at the rear end of the chute, the forwardly curvatures of the outer ends of the cutter arms 61 being effective to add impetus thereto and it is an important feature of the invention that the cutter arms 61 are so formed and the housing constructed to greatly augment the impetus imparted to the discharging material by a blower action which provides a blast of air to maintain high velocity of movement of the material outwardly through the chute.

This is accomplished by the width of the strip stock of the cutter arms and the close proximity of the cutter arms to one another throughout the length of the housing and also the forwardly curved ends of the cutter arms which provides an efficient blower, and it is to be noted also that the width of the arms and the close proximity thereof to one another provides substantially continuous and uniform chopped material impelling and air impelling effect throughout the length of the housing.

Moreover, there is a wide opening 103 between the rear channel iron 21 and the plate 100 for entrance of air which is directed downwardly by the plate 100 to supply a large volume of air in a direction to feed into the path of the rapidly rotating cutter arms 61 to insure a large volume of air discharge through the chute 98 and this blast of discharged air serves as a carrier of the chopped and shredded material and contributes long range of continued impulse which insures positive conveyance of the chopped and shredded material to the remote discharge end of the chute without any conveyance facilities other than the cutting, chopping and shredding facilities themselves.

This blower effect is enhanced by the low level of the channel iron 20 at the front of the housing, which together with the plants and vegetation passing thereunder provides sufficient closure at this place to build up a high blower effect in the housing.

Moreover as the cutter arms sweep rapidly past the thus restricted entrance under the front channel iron 20 a suction effect occurs, which by reason of the restriction of that entrance effectively lifts flattened down plants and vegetaiton up into the zone of cutting, chopping and shredding to insure uniform and thorough removal of plants and vegetation.

The funnel shape form of the chute, does however, tend to choke the flow to the smaller discharge end, and it is an important feature of the chute construction that it is provided at the top thereof immediately beyond the housing H and at the place where it is narrowing down to the exit size, with a large opening 104 which is shielded at the opposite sides by inwardly sloping side boards 105 and along the upper edge with a rearwardly inclined cross board 106, which said opening 104 is thus hooded at the lateral margins and at the upper end and provides air relief to relieve the air choking effect of the tapered chute and insures unretarded air and chopped material flow throughout the entire length of the chute.

Thus, by reason of the width and close proximity of the cutter arms and the highly efficient throwing action thereof, which is greatly augmented by the efficient blower action thereof and the large volume of air blowing out through the chute and unimpeded by any choking effect, the chopped and shredded material not only is constantly and uniformly removed from the interior of the housing and propelled with such impetus through the chute that positive conveyance of the chopped and shredded material to the elevation to discharge into the wagon is assured, but it also leaves the chute with such force that it may be distributed throughout the length of he wagon.

The hood 99 is hinged a 107 to the chute end and has the top wall thereof curved for deflecting purposes and is adjustable on the hinge 107 to deliver the discharging material at a distance to reach the front end of the wagon or to deflect it downwardly into the rear of the wagon.

Preferably this hood is adjustable by the operator on the tractor and for this purpose a hand lever 108 is provided which is pivoted to a segment 109 on the mounting plate 34 and extends therefrom to a place within convenient reach of the tractor operator and this lever 108 is connected by a link 110 with an arm 111 on the hood 99 so that movement of the lever along the segment 109 effects the desired adjustment of the hood 99.

The lever 108 has a releasable latching engagement with the segment 109 at suitable intervals along the latter for safely latching the hood in various positions of adjustment thereof and any convenient facilities may be employed for this purpose.

In the illustrated construction which is shown particularly in FIG. 4, the lever 108 is pivoted at the base of the segment 109 on a pin 112 which permits lateral movement of the lever away from the face of the segment plate, and the lever has a strap 113 thereon which is loosely secured at one end to the lever by a spacer pin 114 and at its other end overlaps the arcuate margin of the segment 109 and is held frictionally thereagainst by a spring 115 which is interposed between the strap and the head of a stem 116 which passes loosely through an opening in the strap 113 and is secured at its other end to the lever 108.

The segment has a plurality of holes 117 therethrough arranged in an arcuate series concentric with the pivot 112, and the lever has a pin 118 thereon which is selectively engageable with any of the holes 117 by moving the lever laterally from the segment plate and swinging it along the plate to the selected opening whereupon the pin 118 is engageable with such selected opening and held therein by the tension of the spring 115.

It is also an important feature of the invention that the chute is adaptable for convenient conversion to discharge the chopped and shredded material back onto the ground behind the cutting, chopping and shredding implement, as shown in FIG. 7.

For this purpose the chute has a removable bottom section 119 which is normally secured in place to constitute a portion of the bottom wall of the chute and has flanges at the opposite ends secured respectively to the downturned flange 101 along the rear edge of the plate 100 and to a flange 120 on the permanent bottom wall portion of the chute by bolts or the like which permit ready removal of the section 119.

A deflector 121 is provided which, when the section 119 is removed, is adapted to be inserted in the opening in the bottom wall of the chute provided by the removal of the section 119 and has a flange 122 which is securable to the upturned flange 28 which is provided along the rear end of the housing top plate 24, and the deflector 121 has brackets 123 securable to the flange 120 of the chute bottom.

This deflector 121 is curved, as shown in FIG. 7 with the trailing end extending downwardly and when mounted in place in the chute, intersects the normal path of discharge through the chute and deflects the chopped and shredded material downwardly onto the ground.

Thus when the implement above described is drawn across a field or any ground area, it lifts up and severs and chops and shreds any plants or vegetation thereon up to a level for which the housing H is adjusted, and discharges the chopped and shredded material, at the option of the user, either into a trailing wagon or back onto the ground at the rear of the implement.

While I have shown and described my invention in a preferred form, I am aware that various changes and modifications may be made therein without departing from the principles of the invention, the scope of which is to be determined by the appended claims.

What is claimed is:

1. An implement of the class described for harvesting ground borne material, said implement comprising an elongated housing provided with means by which it is portably supportable on the ground to move sidewise thereover, said housing having an entrance at the bottom through which material is enterable from the ground and said housing having an exit therefrom through which said material is expellable rearwardly from the housing, and an elongated harvesting element rotatably mounted in the housing and extending lengthwise thereof which is rotatable in the sidewise movement of the housing and is provided with eccentrically pivoted cutter arms throughout at least most of the length thereof which are rotatable with said element and rotatably operable at said entrance of the housing to remove ground borne material from the ground and deliver it into the housing at the front thereof and are rotatably operable in the housing to propel the delivered material upwardly in the housing at the front thereof and rearwardly in the housing at the top thereof to and through the exit, the cutter arms being elongated wide plates extending widthwise throughout their length in the general direction of the length of the housing, each of which said plates is pivoted eccentrically as aforesaid at its inner end on an axis generally paralleling the axis of rotation of the harvesting element to swing forwardly in the direction of rotation of the harvesting element and rearwardly in the reverse direction and has a wide face thereof extending uninterruptedly in a generally radial direction from the pivoted end to the outer end thereof and facing generally forwardly in the direction of rotation of the arm with the harvesting element, the outer portion of the length of the said plate from said pivoted end to the outer end being curved progressively forward in the direction of rotation of the harvesting element at a generally acute angle to said radial direction and terminating in a forwardly presented cutting edge at its outer end and extending across the width thereof, said cutter arms being pivoted as aforesaid eccentrically to the axis of rotation of the harvesting element.

2. An implement of the class described for harvesting ground borne material, said implement comprising an elongated housing provided with means by which it is portably supportable on the ground to move sidewise thereover, said housing having an entrance at the bottom through which material is enterable from the ground and said housing having an exit therefrom through which material is expellable from the housing, and an elongated harvesting element rotatably mounted in the housing and extending lengthwise thereof which is rotatable in the sidewise movement of the housing and is provided with eccentrically pivoted cutter arms throughout at least most of the length thereof which are rotatable with said element and rotatably operable at said entrance of the housing to remove ground borne material from the ground and deliver it into the housing at the front thereof and are rotatably operable in the housing to propel the delivered material upwardly in the housing at the front thereof and rearwardly in the housing at the top thereof to and through the exit, said harvesting element having eccentrically disposed spindles at intervals therearound extending lengthwise thereof and the cutter arms being elongated wide plates of general S-shape with a closed loop at one end extending throughout the width thereof and having one of the spindles extending therethrough for pivoting the arm thereon, each cutter arm having the loop at the inner end thereof with a wide face presented forwardly and extending uninterruptedly outwardly in a generally radial direction from the loop to the outer end of the cutter arm and the outer end portion of the cutter arm being curved progressively forward in the direction of rotation of the harvester element at a generally acute angle to said radial direction and terminating in a forwardly presented cutting edge at its outer end extending across the width thereof, said cutter arms being pivoted as aforesaid eccentrically to the axis of rotation of the harvesting element.

3. An implement as defined in claim 2 in which the portion of the cutter arm plate which is curved progressively forward is progressively inclined toward one side of the path of rotation thereof to impart sidewise deflection of material propelled by the arm in the rotation thereof.

4. An implement of the class described comprising a rotatable centrifugal impeller which is portably supported to travel over the surface of the ground in a direction transverse to the axis of rotation of the impeller and has eccentrically pivoted thereon at their inner ends elongated impeller elements which project outwardly therefrom at intervals therearound and are arranged in sequence axially thereof and provided with forwardly presented cutting edges extending thereacross at their outer ends, and a housing within which the impeller is rotatable and having an entrance at the bottom and an exit between which said entrance and exit the impeller is operable as it travels over the surface of the ground to cause the impeller elements to scoop up material from the surface of the ground at the housing entrance and throw it into the housing and tangentially therefrom through the exit, said housing having therein and facing toward the impeller a surface along which the outer ends of the impeller elements travel at an increasing distance therefrom as they proceed from the entrance to the exit and providing a guideway along which the scooped up material is propelled by the impeller from the entrance to the exit, said impeller elements being provided from their pivoted ends to their outer ends with respective smooth wide flat front faces onto which material is scooped up at the housing entrance and slid centrifugally outward as the impeller elements proceed from the housing entrance to the exit therefrom, the said faces having an approach portion and a deflector portion to which the approach portion extends outwardly from the pivoted end of the impeller element, both said portions extending in a direction generally radially outward from the pivoted end of the impeller element and the deflector portion being continued outward from the approach portion at such slope forwardly in the direction of rotation of the impeller and at a generally acute angle to said radial direction that the scooped up material centrifugally slid thereon from the approach portion is redirected forwardly in the direction of rotation of the impeller and centrifugally discharged tangentially therefrom before it reaches the exit.

5. An implement as defined in claim 4 in which the impeller elements which are in sequence axially of the impeller are staggered circumferentially of the impeller.

6. An implement as defined in claim 4 in which the impeller elements are elongated wide plates with one side thereof facing forwardly and provide the smooth wide front face thereof onto which material is scooped up at the housing entrance and the plates have their opposite lateral edges plain smooth surfaced and uninterrupted from the pivoted end of the element to the outer end thereof.

7. An implement as defined in claim 4 in which the impeller elements are plates of a general S-shape from end to end with one end thereof providing a closed loop by which the element is eccentrically pivoted.

References Cited in the file of this patent

UNITED STATES PATENTS

| | | |
|---|---|---|
| 1,348,471 | Aspinwall | Aug. 3, 1920 |
| 2,559,048 | Seaman | July 3, 1951 |
| 2,684,022 | Smithburn | July 20, 1954 |
| 2,786,317 | Lundell | Mar. 26, 1957 |
| 2,803,101 | Lundell | Aug. 20, 1957 |
| 2,836,023 | Caldwell | May 27, 1958 |
| 2,841,946 | Skromme et al. | July 8, 1958 |
| 2,864,223 | Lundell | Dec. 16, 1958 |
| 2,880,561 | Lundell | Apr. 7, 1959 |
| 2,924,054 | Myers | Feb. 9, 1960 |